(12) United States Patent
Ficner et al.

(10) Patent No.: US 10,042,473 B2
(45) Date of Patent: *Aug. 7, 2018

(54) CUSTOMIZABLE USER INTERFACE

(71) Applicant: Honeywell International Inc., Morristown, NJ (US)

(72) Inventors: Ondrej Ficner, Bucovice (CZ); William Bray, Minneapolis, MN (US); Petr Hanel, Chocen (CZ); Milan Kostelecky, Brno (CZ); Cory Grabinger, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/700,410

(22) Filed: Sep. 11, 2017

(65) Prior Publication Data

US 2017/0371483 A1  Dec. 28, 2017

Related U.S. Application Data

(63) Continuation of application No. 14/591,127, filed on Jan. 7, 2015, now Pat. No. 9,846,505.

(51) Int. Cl.
*G06F 3/041* (2006.01)
*G06F 3/0488* (2013.01)
(Continued)

(52) U.S. Cl.
CPC .............. *G06F 3/0416* (2013.01); *G06F 3/02* (2013.01); *G06F 3/044* (2013.01); *G06F 3/045* (2013.01);
(Continued)

(58) Field of Classification Search
CPC .................................................. G06F 3/0416
(Continued)

(56) References Cited

U.S. PATENT DOCUMENTS 3,911,215 A   10/1975   Hurst et al.
7,623,888 B1  11/2009   Wolter
(Continued)

FOREIGN PATENT DOCUMENTS

EP     0181196 A2    5/1986
WO   2013179040 A2   12/2013

OTHER PUBLICATIONS

"DIY Magic Mirror," 1 page, prior to Jan. 7, 2015.
(Continued)

*Primary Examiner* — Fred Tzeng
(74) *Attorney, Agent, or Firm* — Seager Tufte & Wickhem LLP

(57) ABSTRACT

A device having a display and a user interface incorporating buttons, switches or keys that may be programmable for various functions related to the purpose of the device and its display. The keys may be programmed for virtually any functions available to or on the device. Also, some or all of the keys may be reprogrammed for other or new functions. The device may be programmed by the user with the keys on the device to obtain a custom design having functions assigned to the keys according to a particular design, desire or choice of the user. The keys may be situated on an area having touch sensitive technology such that touching a particular key will call forth a function that is assigned to the key. The keys may be in a touch sensitive area apart from the display or be fully or in partly on a touch sensitive display.

20 Claims, 10 Drawing Sheets

(51) Int. Cl.
　　　G08C 17/00　　(2006.01)
　　　G06F 3/044　　(2006.01)
　　　G06F 3/02　　(2006.01)
　　　G06F 3/045　　(2006.01)
(52) U.S. Cl.
　　　CPC ......... *G06F 3/04886* (2013.01); *G08C 17/00* (2013.01); *G08C 2201/30* (2013.01)
(58) Field of Classification Search
　　　USPC ....................................................... 345/174
　　　See application file for complete search history.

(56) References Cited

U.S. PATENT DOCUMENTS

| | | | |
|---|---|---|---|
| 7,865,422 | B2 | 1/2011 | Lutnick et al. |
| 8,103,970 | B1 | 1/2012 | Allen et al. |
| 8,482,534 | B2 | 7/2013 | Pryor |
| 9,846,505 | B2 | 12/2017 | Ficner et al. |
| 2006/0050142 | A1 | 3/2006 | Scott et al. |
| 2006/0132449 | A1 | 6/2006 | Pironio |
| 2006/0143572 | A1 | 6/2006 | Scott et al. |
| 2006/0288300 | A1 | 12/2006 | Chambers et al. |
| 2007/0063980 | A1 | 3/2007 | Eich et al. |
| 2010/0085303 | A1 | 4/2010 | Kwok et al. |
| 2012/0109455 | A1 | 5/2012 | Newman et al. |
| 2012/0176320 | A1 | 7/2012 | Burrell, IV |
| 2013/0127762 | A1 | 5/2013 | Tong |
| 2015/0084877 | A1 | 3/2015 | Wang |
| 2015/0301671 | A1 | 10/2015 | Fan et al. |
| 2016/0195973 | A1* | 7/2016 | Ficner .................. G06F 3/0416 345/174 |

OTHER PUBLICATIONS

Honeywell, "Zio Lite TR40/42 LCD and non-LCD Wall Modules, Installation Instructions," 4 pages, May 2014.
Honeywell, "Zio Lite Wall Modules TR40 and TR42 Models with Sylk, Specification Data," 2 pages, 2015.
http://www.sciencedaily.com/releases/2013/10/131008112437.htm, "Printed Electronics: A Multi-Touch Sensor Customizable with Scissors," 11 pages, Oct. 8, 2013.
http://www.zytronic.co.uk/support/product-info/description/zyprofilm, "Zytronic Flexible Interactive Film Projected Capacitance Touch Panels, Product Info," 2 pages, prior to Jan. 7, 2015.

* cited by examiner

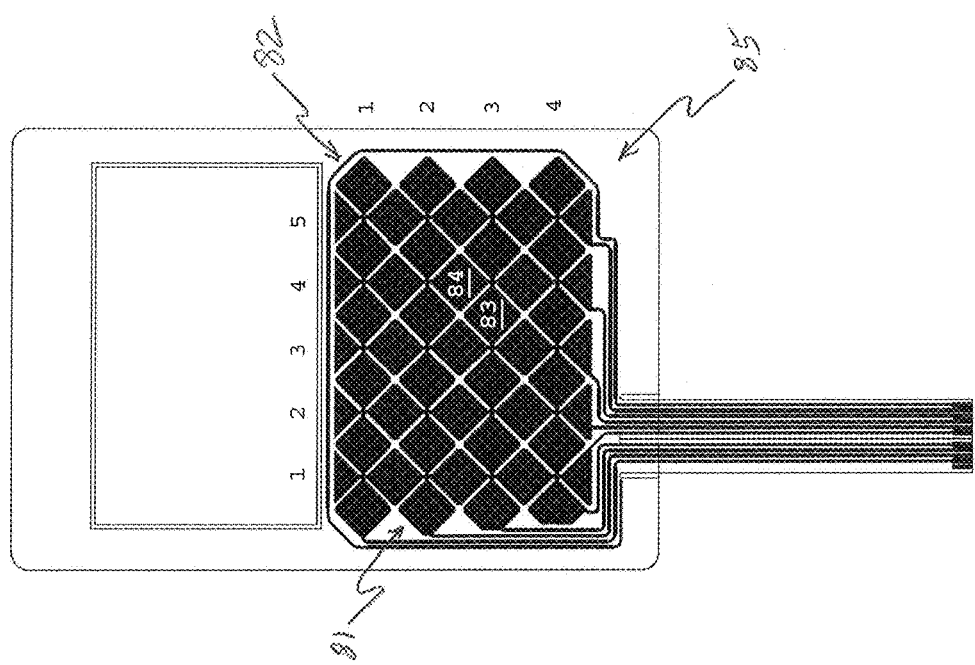

CUSTOMIZABLE USER INTERFACE

This present application is a Continuation of U.S. patent application Ser. No. 14/591,127, filed on Jan. 7, 2015. U.S. patent application Ser. No. 14/591,127, filed on Jan. 7, 2015, is hereby incorporated by reference.

BACKGROUND

The present disclosure pertains to displays and particularly to displays having a user interface consisting of buttons, keys or the like.

SUMMARY

The disclosure reveals a device that may have a display and a user interface incorporating buttons, switches or keys that are programmable for various functions related to the purpose of the device and respective display. The keys may be programmed for any functions available to or on the device. Also, some or all of the keys may be reprogrammed for other or new functions. The device may be programmed by the user with the keys on the device to obtain a custom design having functions assigned to the keys according to a particular design, desire or choice of the user. The keys may be situated on an area having touch sensitive technology such that touching a particular key will call forth a function that is assigned to the key by virtue of programming by the user. A code may be entered to lock the keys to their assigned functions so that changes made intentionally or unintentionally by an authorized person are ineffective. The keys may be in a touch sensitive area apart from the display or be fully or in partly on a touch sensitive display. The keys may have labels. Labels on a display portion may be electronically changeable. Functions to be assigned to designated keys may be presented by name, symbol or code on the display which may be selected and assigned to the respective keys.

DESCRIPTION OF THE DRAWING

FIG. 6 is a diagram columns of electrodes and rows of electrodes overlapped and proximate with one another;

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Heating, ventilation and air conditioning (HVAC) wall modules, thermostats and other devices may be typically implemented with buttons with fixed functionality, position and response. These buttons may be mechanical with a preset actuation and functionality. This might not necessarily allow for flexibility and expansion in, for example, HVAC systems.

A sensing area (capacitive in the present example) on a wall module (touchpad like) may result in a possibility of new levels of flexibility. The area may provide a possibility to control wall modules through icons on the display, sensing of discrete finger positions, support gestures, and the like. This system may also be flexible because it can allow programmable functionality from the sensing area. Complete sensing area may reacts accordingly to the application, situation, implementation, and so forth.

Technologies such as resistive touch layer over a display, a capacitive sensing layer over the display or touchpad solutions in general may be used on the devices. The sensing layer may be used and implemented on the surface layer of, for example, a wall module. The sensing area may then be harnessed in a freely programmable way with only changes in application programming.

Creating custom user interfaces (wall modules as examples in this case) for each application (lighting, HVAC, security, and so forth) and each brand using different design languages may be slow and costly. There appears to be a need to create separate button configurations, hardware implementations and firmware to accommodate different arrangements. The terms "button", "key", "touch point", "sub-area", "switch", "sub-circuit", "label" and like words, may be used interchangeably in the present description.

The present disclosure may solve the issue by allowing the wall module or other device with a display and buttons to essentially learn where the buttons are by touching them. So rather than designing dedicated non-flexible user interface solutions, one may start with a generic solution that is quickly tailored to individual needs. The solution could be implemented at design time, at production time, or by end customers depending on a system level implementation.

The present device may be implanted with a capacitive sensing grid area over the user interface surface. The grid overlay may be coupled with a capacitive sense sub-circuit and firmware framework to allow one to quickly move button locations and functions around on the interface surface.

Figure 1:
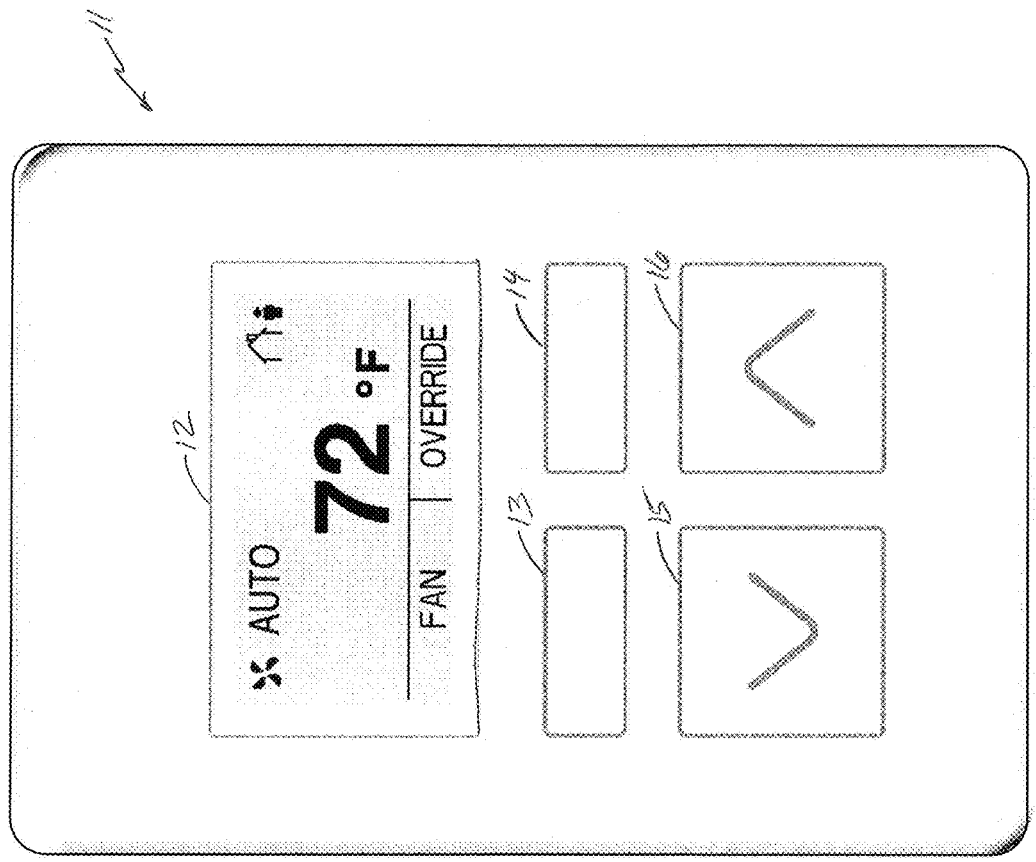
FIG. 1 is a diagram of an example control or observation device such as a wall module, thermostat or other mechanism.

FIG. 1 is a diagram of an example device such as a wall module, thermostat or device 11 often associated with a heating, ventilation and air conditioning system (HVAC). Device 11 may be also associated with security, fire, lighting and other systems. Device 11 may have a display 12, and function select buttons 13 and 14. Where appropriate or needed, device 11 may have magnitude or quantity adjustment buttons 15 and 16.

Figure 2:
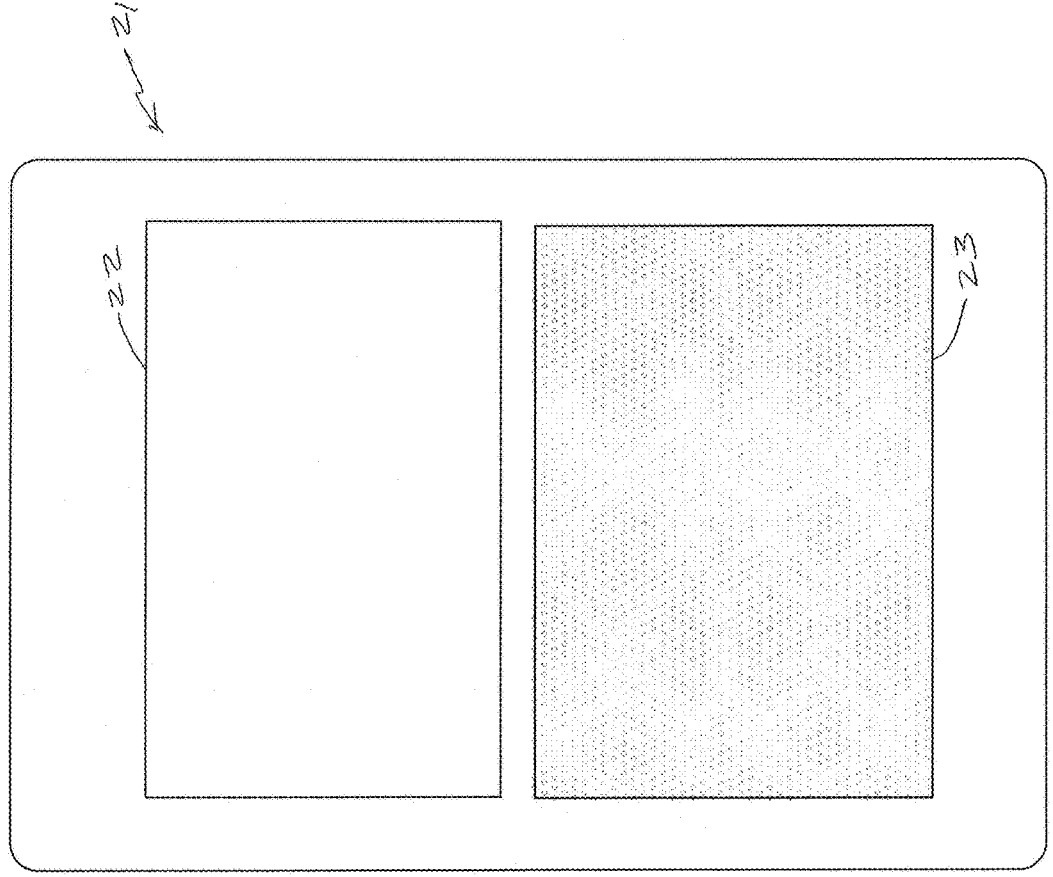
FIG. 2 is a diagram of a device having a display and a touch sensitive area for keys.

FIG. 2 is a diagram of a device 21 having a display 22, and a touch sensitive area 23. Sensitive area 23 may have a capacitive touch layer, a resistive touch layer, or other technology type touch layer. The touch sensing area may be harnessed in a freely programmable way with changes in application programming.

Area 23 may be, for example, be implanted with a capacitive sensing grid. Area 23 may have a thin layer with labels, such as numbers and/or letters designating various touch regions. The thin layer may be replaceable with another thin layer or layers having different labels as desired.

Figure 3:
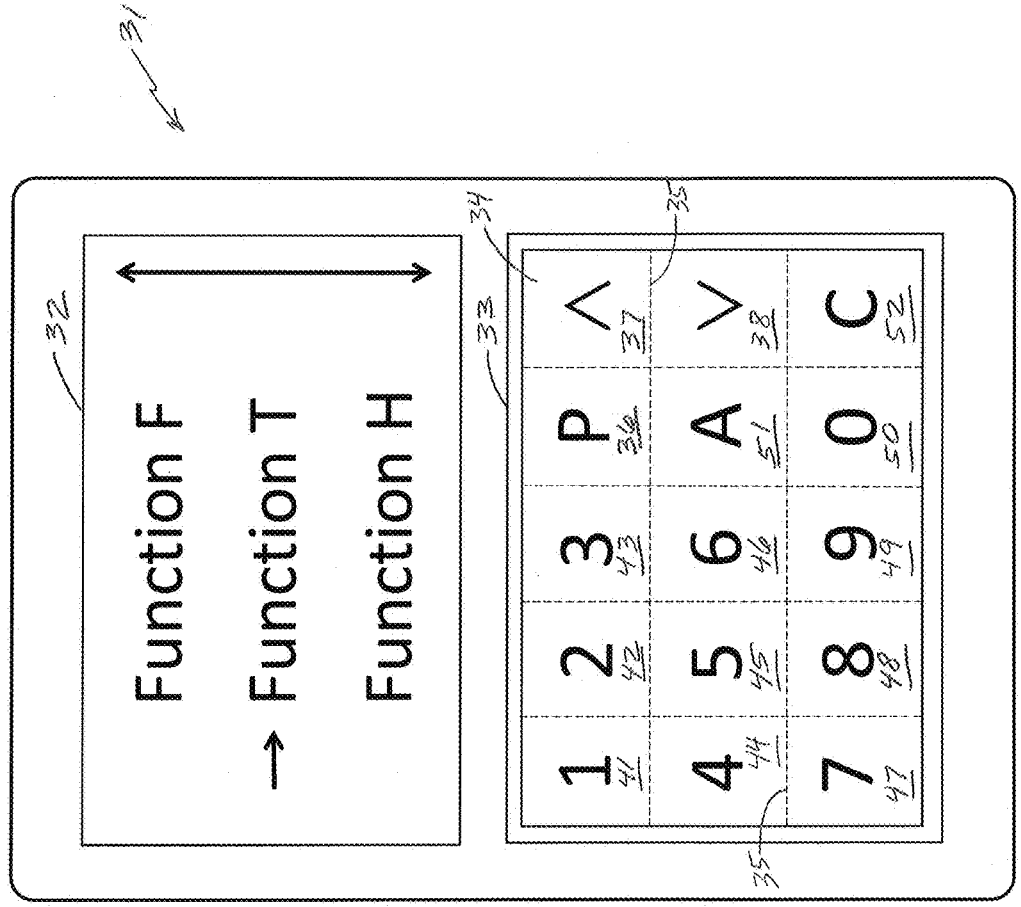
FIG. 3 is a diagram of an example user touch interface area having for keys a label layer situated on or adhered to the area.

FIG. 3 is a diagram of an example device 31 incorporating a user touch interface area 33 having a label layer 34 situated on or adhered to an area 33. Label layer 34 may have fifteen distinct sub-areas 35 of sensitivity. However, there may be more or fewer sub-areas than fifteen for distinct tactile sensitivity of a certain area having respective labels. A signal initiated by the certain sub-area being touched may be assigned a function shown on a display 32. The function may be assigned to a selected sub-area 35, by touching a name on display 32 representing the function shown on the display.

A touch type display 32 may contain virtually all of the buttons and areas desired for scrolling and assigning functions, for selecting temporary buttons and their labels which may be changed on the display, for permanent buttons, and for other components and actions. These items may be effected electronically and by programming.

An example of operation may be noted; however, there can be variants of procedures for operation of device 31. For an illustrative example, a "P" (program) button 36 may be pressed to bring functions up on display 32. The functions may be scrolled up or down on display 32 with buttons or keys 37 and 38, respectively. One of the keys or buttons 41-50, having labels from "1" to "0", respectively, may be pressed to select the key or button to be assigned the function shown at a center of display 32, as noted by an arrow or other indicator. For instance, button 45 with a label indicating "5" may be pressed for assigning "Function T" to button 45. Button 51 with a label indicating "A" may be pressed to accept Function T as being assigned to button 45 with label "5". Display 32 may return to a normal operating state for the thermostat, wall module or the like of device 31, after a brief period of time which may be adjusted with an assignment of a function to a key having a particular label. When device 31 is in a normal operating state (i.e., a non-programming state), button 45 with label "5" may be pressed to go to Function T. Function T may be a temperature setpoint for a space. The setpoint may be changed or adjusted by pressing up button 37 to increase the setpoint or down button 38 to decrease the setpoint. The temperature setpoint may be displayed as a separate item by itself, or as a highlighted item on a display 32 showing a number of various items at once. Button 52 may have a label "C" which may be used for closing an assignment of a function to a button or closing a specific function brought to display 32 after pressing the pertinent button being assigned the specific button, for instance, in a case of an adjustment of setpoint or selection.

A combination of buttons in a program mode after pressing button 36 with the label "P" may be pressed for a particular function assignment. For example, buttons 42, 47 and 49 may be pressed for number 279, according to the respective labels "2", "7" and "9", for assignment of a function selected on the display which may be accepted by pressing button 51 with the label A. To obtain a function assigned to number 279, the buttons for labels "2", "7" and "9" may be sequentially pressed during the normal operating state to get the function assigned to number 279.

The buttons may be reassigned functions different from the functions previously assigned to the buttons. For example, button 45 with label "5" having been assigned "Function T" may be pressed after button 36 with label "P" has been pressed, and reassigned another function selected on display 32, such as "Function H". Button 51 with label "A" may be pressed to accept the assignment, or after a period of time the assignment, without pressing button 51, may be accepted and display 32 can return to a state for normal operation of device 31. Alternatively, if button 51 is not pressed to accept the assignment, display 32 may after a period of time return to the state for normal operation without effecting the assignment of the selected function to the button 51 pressed for assignment of the selected function. The period of time may be adjusted through selection and assignment of another function to a designated button. Functions to be assigned to designated buttons may be represented by, for example, names, labels, symbols, icons or codes on the display, which may be selected and assigned to the respective keys. A code may be entered to lock the buttons to their assigned functions so that changes made intentionally or unintentionally are ineffective.

Figure 4:
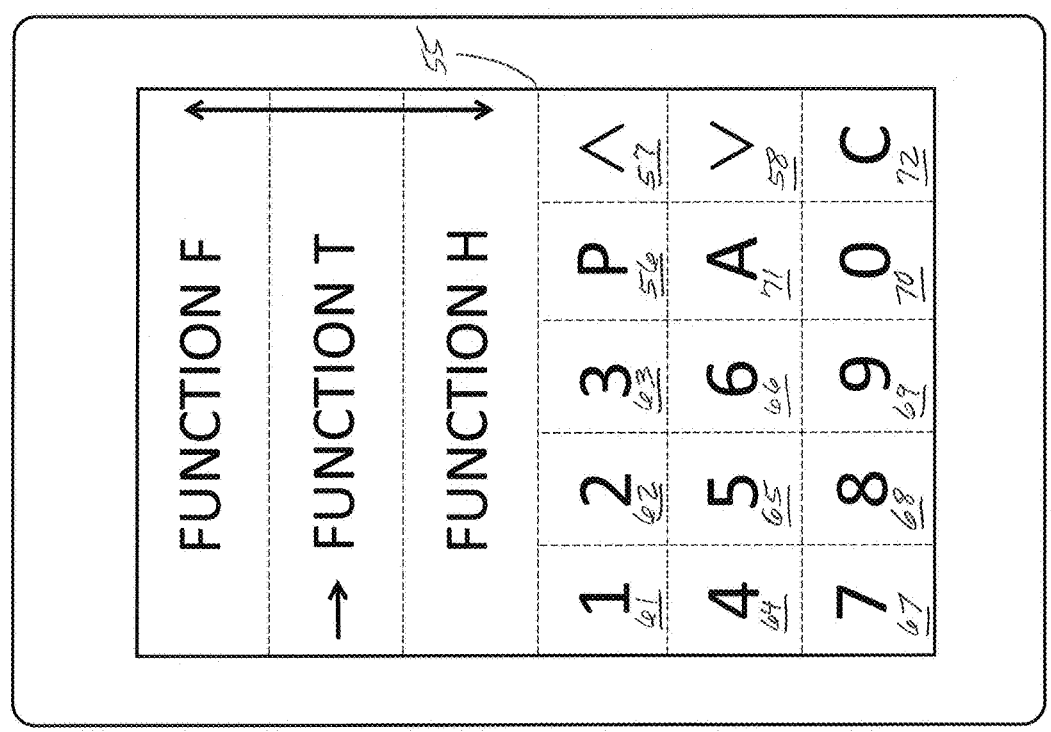
FIG. 4 is a diagram of a device having a touch sensitive display with keys situated on the display.

FIG. 4 is a diagram of a thermostat, wall module or device 54 having a touch display 55 with buttons 36-38 and 41-52 on touch sensitive surface 33 of device 31 being substituted with touch sensitive buttons 56-58 and 61-72, respectively, on touch display 55. Device 54 may be operated in a same manner as device 31.

Alternatively, the functions on display 55 may be scrolled with a finger on the display in lieu of buttons 57 and 58. A function on display 55 may be accepted or assigned to a selected button with a tap or double tap on the function label, name, symbol, icon, code, or the like, on display 55 in lieu of touching button 71 with label "A". The labels for buttons 56-58 and 61-72 may be changed electronically via programming that may be part of the functionally of device 54. An arrangement, configuration and number of sensitive areas on display 55 may also be changed. An amount of flexibility available or desired may be designed into device 54, according to choices and needs of a user or customer.

Figure 5B:
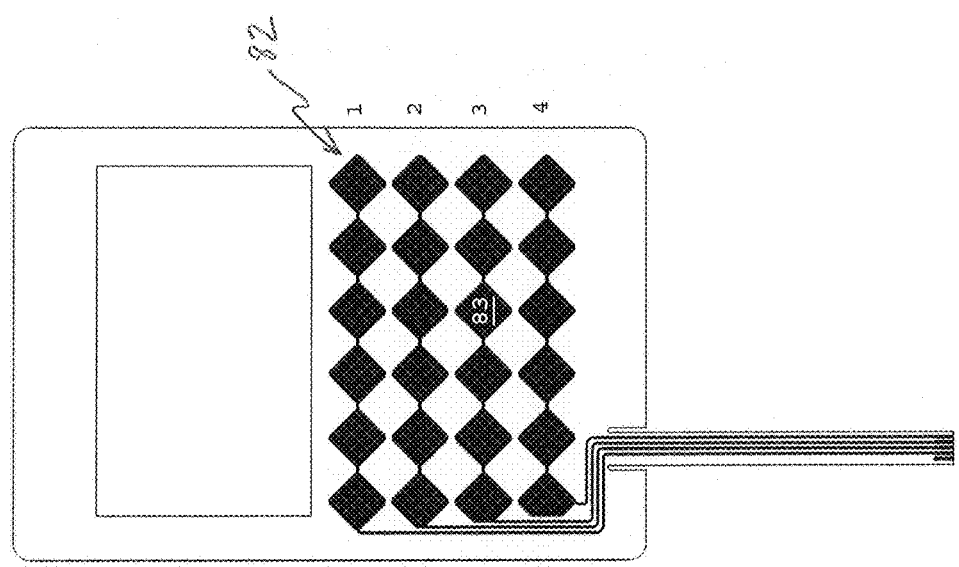
FIG. 5b is a diagram of rows of electrodes for the capacitive touch area.
Figure 5A:
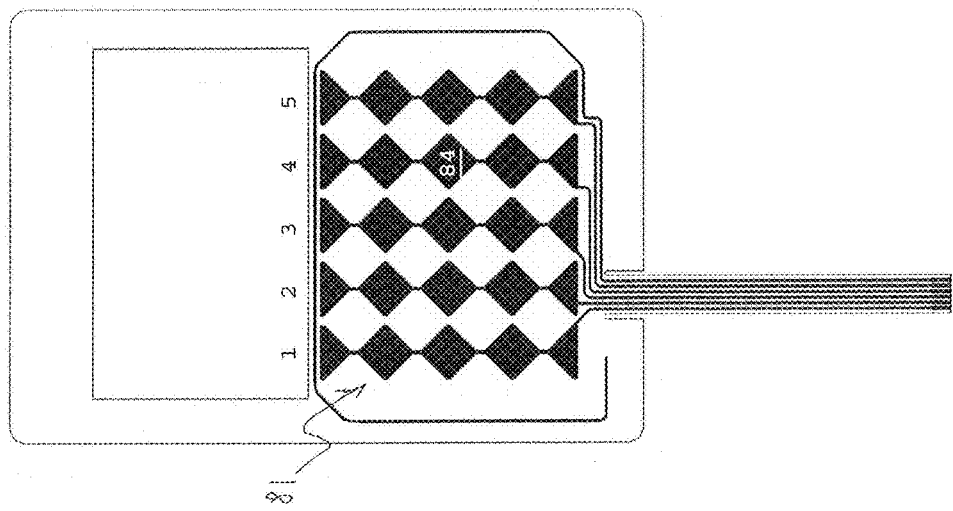
FIG. 5a is a diagram of columns of electrodes for a capacitive touch area.

FIG. 5a is a diagram of columns of electrodes 81 for a capacitive touch area. FIG. 5b is a diagram of rows of electrodes 82. The columns of electrodes and the rows of electrodes may be overlapped proximate to each other, as shown in a resulting layout 85 of a diagram of FIG. 6, and have a thin dielectric film situated between them to avoid electrical shorts. A touch on a capacitive area may change the capacitance between an electrode of a specific row and an electrode of a specific column. The change of capacitance may be electronically detected and a location of the changed capacitance can be determined in a grid fashion by a row number and column number of the electrodes. For example, a touch at location 84 may be result in a change of capacitance between an electrode 83 at row 3 and an electrode 84 at column 4. The subject electrode elements 84 and 83 may be as shown in the electrode layouts 81 and 82, and resulting layout 85 in the diagrams of FIGS. 5a, 5b and 6, respectively. There may be virtually any number of rows and columns of electrodes in a touch sensitive area.

Figure 7:
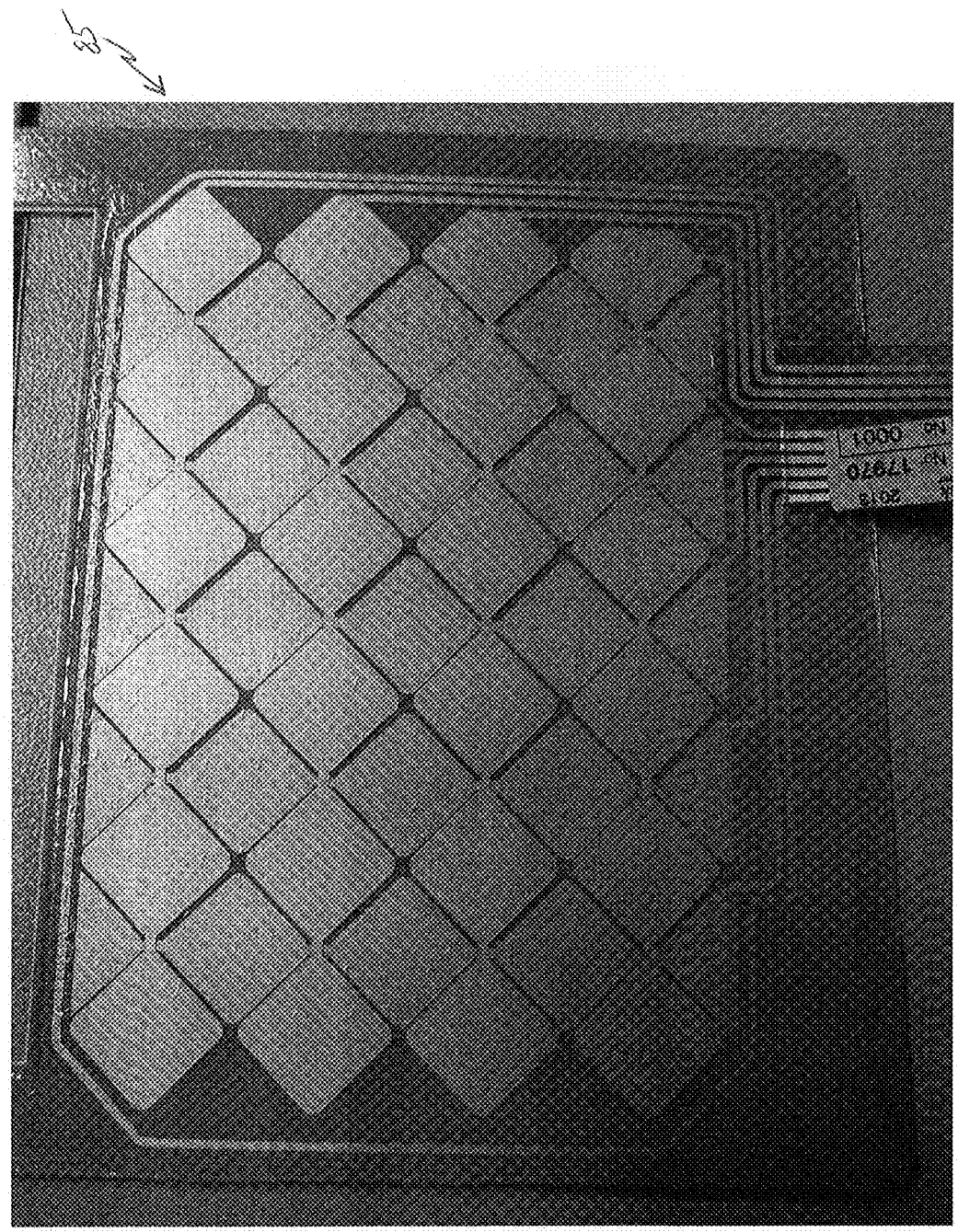
FIG. 7 is a diagram showing a perspective view of a fabricated touch sensitive area.

FIG. 7 is a diagram showing a perspective view of a fabricated touch sensitive area 85.

Figures 8A, 8B, 8C:
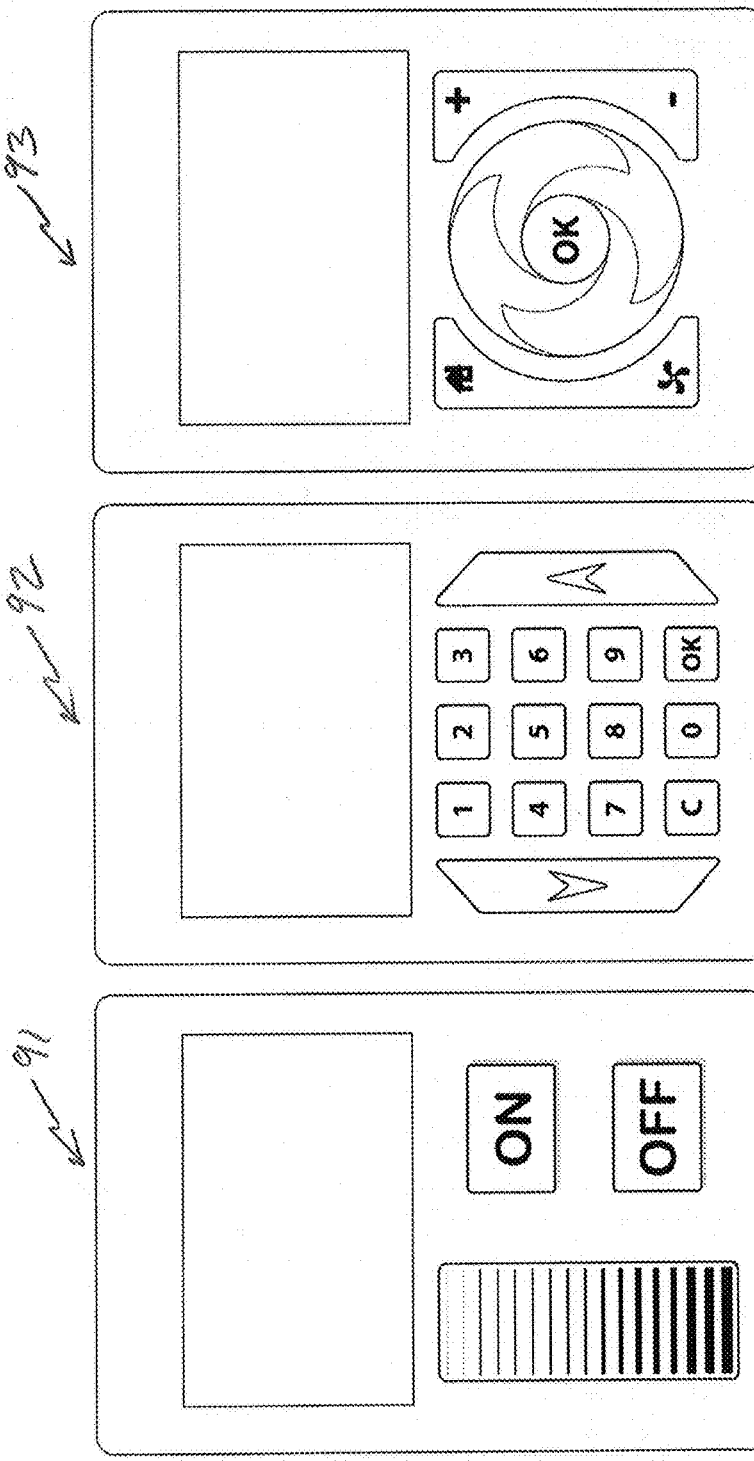
FIGS. 8a, 8b and 8c are diagrams of various examples of configurations of layouts of buttons or keys that may be overlaid on a touch sensitive area or display.

FIGS. 8a, 8b and 8c are diagrams of various examples of configurations of layouts 91, 92 and 93, respectively, that may be overlaid on a touch sensitive area or display as discussed herein.

Figure 9C:
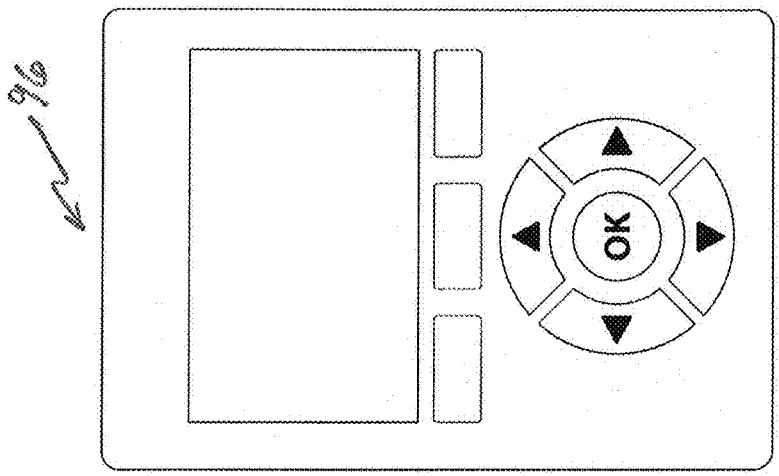
FIGS. 9a, 9b and 9c are diagrams of additional configurations of layouts of buttons or keys that may be overlaid on a touch sensitive area or display.
Figure 9B:
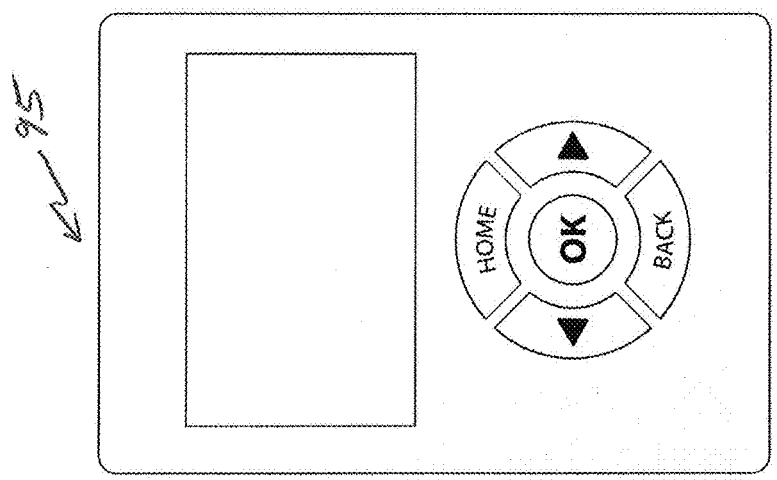
Figure 9A:
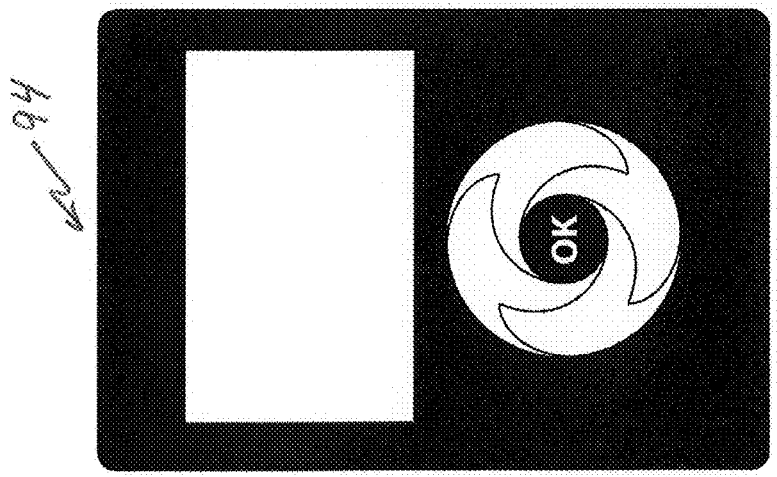

FIGS. 9a, 9b and 9c are diagrams of additional configurations of layouts 94, 95 and 96 of buttons or keys that may be overlaid on a touch sensitive area or display as discussed herein. Other layouts may have some of the buttons, keys or the like, on the touch sensitive keyboard and, some on the touch sensitive display. Also, there may be buttons that are not touch sensitive situated on the module, thermostat or device.

Figure 10:
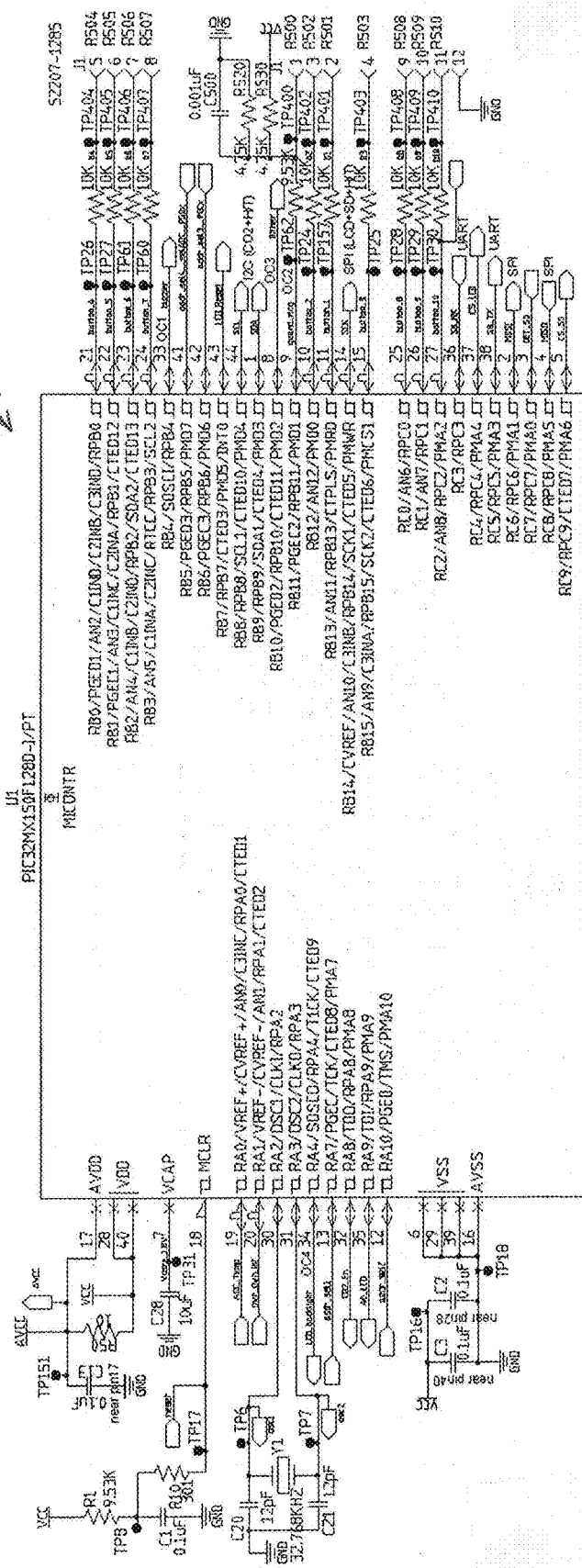
FIG. 10 is a diagram of a schematic of example circuitry that may be utilized at least in part for a customizable user interface.

FIG. 10 is a diagram of a schematic of example circuitry 98 that may be utilized at least in part for the present customizable user interface disclosed herein.

To recap, a customizable user interface may incorporate a processor, a sensing area connected to the processor, a display connected to the processor, interface circuitry connected to the processor, a sensor signal input connected to the interface circuitry, and a control signal output connected to the interface circuitry. The sensing area may incorporate a grid of touch sensitive areas. Each touch sensitive area may be programmed for a function. Each touch sensitive area can be reprogrammed for another function.

A touch sensitive area may incorporate a touch switch. The grid of touch sensitive areas may incorporate a grid of touch switches.

A pressed first button may scroll one or more functions at a time on the display. A second button may assign a function on the display to a selected touch switch. The first button may scroll to another function. The second button may assign the other function to another selected touch switch.

The first button may scroll to additional functions. The second button may assign the additional functions to additional selected touch switches, respectively. A touch switch may be selected by touching the touch switch.

The first button may be a touch switch pre-assigned for scrolling functions on the display. The second button may be a touch switch pre-assigned for assigning a scrolled function to a selected touch switch.

The grid of touch switches may incorporate an item selected from a group consisting of a capacitive sensing layer and a resistive sensing layer.

At least part of the grid of touch switches may be situated on the display. A function on the display may be assigned to a selected switch by touching a name on the display designating the function.

At least part of the grid of touch switches may be situated on a surface proximate to the display.

One or more touch switches on the display having functions assigned may be labeled or relabeled with designations on the display corresponding to the functions assigned.

The customizable interface may be integrated into a wall module for a system or component selected from a group consisting of HVAC systems, security systems, lighting systems, and fire systems.

An approach for customizing a user interface, may incorporate touching a permanent button on a user interface to scroll to a first symbol representing a function on a display of the user interface, and touching a temporary button situated over a sensing grid to assign the function to the temporary button.

The approach may further incorporate touching the permanent button on the user interface to scroll to a second symbol representing another function on the display, and touching a second temporary button situated over the sensing grid to assign the other function on the display of the user interface to the temporary second button.

The approach may further incorporate touching one or more times the permanent button on the user interface to scroll to one or more additional functions, respectively, on the display, and touching one or more additional temporary buttons situated on or over the display to assign one or more additional functions of the user interface to the one or more additional temporary buttons, respectively.

The buttons may be on a touch display. There may be labels on the display associated with the one or more temporary buttons on the display that may be changed electronically and/or by programming. Touching or tapping a name or a designation of a function, i.e., a function, on the display may assign the function to a selected temporary button. Scrolling up or down a list of function names or designations, i.e., functions, may be done with touching the screen.

The user interface may be at least a part of a wall module or a component selected from a group consisting of HVAC systems, security systems, lighting systems, and fire systems.

The approach may further incorporate touching the permanent button on the user interface to scroll to another symbol representing a second function on the display of the user interface, and touching the temporary button situated over the sensing grid to assign a second function in lieu of a previously assigned function to the temporary button.

A wall module system may incorporate a wall module, a sensing surface area on the wall module, a display on the wall module; a button, in a mode for assigning a location on the sensing surface area to a function, for accessing functions of the wall module on the display; and a processor connected to the display, the button, and the sensing surface area.

Touching the sensing surface area at a particular location may result in a signal to the processor indicating the particular location on the sensing surface area, Touching the sensing surface area at the particular location, when a certain function is on the display, may associate the particular location with the certain function. Touching the sensing surface area at the particular location may activate the certain function during a mode for operation of the wall module.

Touching the sensing surface area at the particular location, when another function is on the display, may associate the particular location with the other function. Touching the sensing surface at the particular location may activate the other function during the mode for operation of the wall module.

The sensing surface area may incorporate a plurality of locations that can be associated with various functions of the wall module which are activated upon a touching of the respective locations of the plurality of locations. Functions of the respective locations on the sensing surface area can be changed during the mode for assigning a location on the sensing surface area to a function. An electronically displayed label associated with the location on the sensing surface area may be changed.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A customizable user interface, comprising:
a processor;
a sensing area connected to the processor;
a display connected to the processor;

interface circuitry connected to the processor;
a sensor signal input connected to the interface circuitry; and
a control signal output connected to the interface circuitry; and
wherein the sensing area comprises:
a grid of touch sensitive areas; and
wherein each touch sensitive area can be individually and separately programmed for a first function and then reprogrammed for a second function, all without programming or reprogramming any other touch sensitive areas; and
wherein programming and reprogramming the touch sensitive areas involves pressing a program button to place the sensing area into a program mode, changing the first function of one of the one or more of the touch sensitive areas to the second function without programming or reprogramming any other touch sensitive area, accepting the change, and returning the sensing area to a normal operating mode.

2. The customizable user interface of claim 1, wherein accepting the change includes pressing an accept button.

3. The customizable user interface of claim 1, wherein each touch sensitive area is configured such that when in the normal operating mode, pressing a first touch sensitive area causes a first function to occur, then when in the program mode, pressing the first touch sensitive area changes the first function of the first touch sensitive area to a second function, and then when returned the normal operating mode, pressing the first touch sensitive area causes the second function to occur.

4. The customizable user interface of claim 1, wherein when in the program mode, a plurality of functions are displayed on the display, spaced apart from the touch sensitive areas.

5. The customizable user interface of claim 4, wherein the display is a touch sensitive display, wherein a desired one of the plurality of functions is selected by touching the desired function.

6. The customizable user interface of claim 5, wherein a function name representing the desired function scrolled with a finger on the display is touched to assign the desired function to a selected touch switch.

7. The customizable user interface of claim 1, further comprising a locking mechanism configured to lock the touch sensitive areas to their functions such that further reprogramming is not allowed.

8. The customizable user interface of claim 7, wherein the locking mechanism is a code to be entered on the grid of touch sensitive areas.

9. The customizable user interface of claim 1, wherein at least part of the grid of touch sensitive areas is situated on the display.

10. The customizable user interface of claim 1, wherein:
a pressed first button scrolls one or more functions at a time on the display;
a second button assigns a function on the display to a selected touch switch; and
the first button scrolls to another function; and
the second button assigns the other function to another selected touch switch.

11. The customizable user interface of claim 10, wherein:
the first button scrolls to additional functions; and
the second button assigns the additional functions to additional selected touch switches, respectively.

12. The customizable user interface of claim 11, wherein a touch switch is selected by touching the touch switch.

13. The customizable user interface of claim 10, wherein:
the first button is a touch switch pre-assigned for scrolling functions on the display; and
the second button is a touch switch pre-assigned for assigning a scrolled function to a selected touch switch.

14. The customizable user interface of claim 1, wherein the grid of touch sensitive areas comprises an item selected from a group consisting of a capacitive sensing layer and a resistive sensing layer.

15. The customizable user interface of claim 1, wherein the customizable user interface is integrated into a wall module for a system or component selected from a group consisting of HVAC systems, security systems, lighting systems, and fire systems.

16. A method for customizing a user interface, comprising:
touching a program button on a user interface to enter a program mode, wherein touching the program button causes a list of a plurality of functions to be presented in a scrollable list on a display of the user interface, where at least two of the plurality of functions are displayed at a time, wherein a user may change which functions are being displayed by scrolling through the list with a finger;
scrolling through the list of functions to a first symbol representing a first function on the display of the user interface;
touching a first temporary button situated over a sensing grid to assign only the first function to only the first temporary button, without assigning any function to any other temporary buttons;
after touching the first temporary button to assign the first function to the first temporary button, then again scrolling to a second symbol representing a second function on the display; and
touching a second temporary button situated over the sensing grid to assign only the second function on the display of the user interface to only the second temporary button, without assigning any function to any other temporary buttons.

17. The method of claim 16, further comprising:
scrolling to one or more additional functions, respectively, on the display; and
touching one or more additional temporary buttons situated over the display to assign the one or more additional functions of the user interface to the one or more additional temporary buttons, respectively.

18. The method of claim 16, wherein the user interface is at least a part of a wall module or a component selected from a group consisting of HVAC systems, security systems, lighting systems, and fire systems.

19. The method of claim 16, further comprising, after touching the second temporary button to assign the second function, activating a locking mechanism to lock the first and second temporary buttons to their assigned functions such that further changes are not permitted.

20. The method of claim 19, wherein activating the locking mechanism includes entering a locking code using one or more temporary or permanent buttons on the user interface.

* * * * *